Inventors
Abner Brenner
Dwight E. Couch
Eugenia K. Williams

June 23, 1953

A. BRENNER ET AL 2,643,221

ELECTRODEPOSITION OF PHOSPHORUS-NICKEL
AND PHOSPHORUS-COBALT ALLOYS

Filed Nov. 30, 1950

Inventors
Abner Brenner
Dwight E. Couch
Eugenia K. Williams
By J. H. Church, O. Codier
and D. P. Smith
ATTORNEYS AND AGENT Fig. 9. TYPICAL BATHS FOR DEPOSITING PHOSPHORUS ALLOYS

| BATH NO. | BATH TYPE | NiSO$_4$·6H$_2$O MOLES PER LITER | NiSO$_4$·6H$_2$O GRAMS PER LITER | NiCl$_2$·6H$_2$O MOLES PER LITER | NiCl$_2$·6H$_2$O GRAMS PER LITER | METAL AS PHOSPHATE OR PHOSPHITE[a] MOLES PER LITER | METAL AS PHOSPHATE OR PHOSPHITE[a] GRAMS PER LITER | H$_3$PO$_4$ MOLES PER LITER | H$_3$PO$_4$ GRAMS PER LITER | H$_3$PO$_3$ MOLES PER LITER | H$_3$PO$_3$ GRAMS PER LITER | CURRENT DENSITY AMP/DM$^2$ | pH | TEMPERATURE °C | CATHODE EFFICIENCY 75°C PERCENT | P IN DEPOSIT PERCENT | TYPE OF DEPOSIT |
|---|---|---|---|---|---|---|---|---|---|---|---|---|---|---|---|---|---|
| 1 | Ni-L[b] | 0.67 | 175 | 0.21 | 50 | 0.12 | --- | 0.5 | 50 | 0.015 | 1.3 | 5 To 40 | 0.5 To 1.0 | 75 To 95 | 65 | 2 To 3 | DULL, MATTE, STRONG. |
| 2 | Ni-H[b] | .57 | 150 | .19 | 45 | .24 | --- | .5 | 50 | .5 | 40 | 5 To 40 | 0.5 To 1.0 | 75 To 95 | 50 | 12 To 15 | BRIGHT, STRONG, BRITTLE. |
| 3 | Ni-P[b] | --- | --- | --- | --- | 1.0 | --- | --- | --- | 2.0 | 160 | 5 To 40 | 0.5 To 1.0 | 75 To 95 | --- | --- | BRIGHT, STRONG, BRITTLE. |
| | | | | CoCl$_2$·6H$_2$O | CoCl$_2$·6H$_2$O | | | | | | | | | | | | |
| 4 | Co-L[b] | --- | --- | 0.88 | 210 | 0.12 | --- | .5 | 50 | 0.02 | 2.0 | 5 To 40 | 0.5 To 1.0 | 75 To 95 | 90 | 1 To 2 | DULL, MATTE, STRONG. |
| 5 | Co-H[b] | --- | --- | .76 | 180 | .24 | --- | .5 | 50 | .5 | 40 | 5 To 40 | 0.5 To 1.0 | 75 To 95 | 55 | 9 To 11 | BRIGHT, STRONG, BRITTLE. |
| 6 | Co-P[b] | --- | --- | --- | --- | 1.0 | --- | --- | --- | 2.0 | 160 | 5 To 40 | 0.5 To 1.0 | 75 To 95 | 45 | 11 To 12 | BRIGHT, STRONG, BRITTLE. |
| 7 | Co-F[b] | --- | --- | 1.0 | 240 | --- | --- | 1 MOLAR HCOOH 45 GRAMS PER LITER | | 0.02 | 2.0 | 5 To 30 | 1.5 To 2.0 | 75 To 95 | 95 | 0.8 To 1.2 | DULL, MATTE, STRONG, SOME DUCTILITY. | a. A SOLUTION OF PHOSPHORIC ACID AND PHOSPHOROUS ACID WAS PARTIALLY NEUTRALIZED WITH METAL CARBONATE. ABOUT 15 g OF METAL CARBONATE (THIS IS APPROXIMATELY 7.5 g METAL) IS REQUIRED TO NEUTRALIZE 50 g[c] OF PHOSPHORIC ACID OR 40 g[d] OF PHOSPHOROUS ACID TO pH OF 0.5 TO 1.0. ALL OF THE ABOVE BATHS WERE PREPARED SO THAT THE TOTAL METAL CONCENTRATION WAS ABOUT 1 MOLAR (60 G/LITER).

b THE LETTERS "L" AND "H" REFER TO PHOSPHATE-PHOSPHITE BATHS THAT PRODUCE DEPOSITS OF LOW- AND HIGH-PHOSPHORUS CONTENT, RESPECTIVELY; "P" REFERS TO BATHS CONTAINING NO ANION OTHER THAN PHOSPHITE; "F" REFERS TO A BATH CONTAINING FORMATE. HYDROXYACETIC ACID MAY BE SUBSTITUTED FOR THE FORMIC ACID IN THIS BATH IN CONCENTRATIONS OF 50 TO 60 G/LITER.

c EQUIVALENT TO 35 ML OF THE 85% PHOSPHORIC ACID.

d EQUIVALENT TO 115 ML OF THE 30% PHOSPHOROUS ACID.

INVENTORS
Abner Brenner
Dwight E. Couch
Eugenia K. Williams
BY J.H. Church, O. Codier and D.P. Smith
ATTORNEYS AND AGENT Patented June 23, 1953

2,643,221

UNITED STATES PATENT OFFICE 2,643,221

ELECTRODEPOSITION OF PHOSPHORUS-NICKEL AND PHOSPHORUS-COBALT ALLOYS

Abner Brenner, Chevy Chase, and Dwight E. Couch, Hyattsville, Md., and Eugenia K. Williams, Charlottesville, Va., assignors to the United States of America as represented by the Secretary of the Army Application November 30, 1950, Serial No. 198,471

7 Claims. (Cl. 204—43)

(Granted under Title 35, U. S. Code (1952), sec. 266)

The invention described in the following specification and claims may be manufactured and used by or for the United States Government for governmental purposes without the payment to us of any royalty thereon.

Our invention relates generally to the electrodeposition art and more specifically to the electrodeposition of alloys of phosphorus with nickel or cobalt.

We have electrodeposited alloys containing nickel or cobalt and as much as 15 percent of phosphorus from solutions containing phosphites. The alloys are hard and may be further hardened by heat-treating at 400° C. The high-phosphorus nickel alloy is more resistant to attack by hydrochloric acid than pure nickel deposits. The high-phosphorus alloys are bright as deposited, but their reflectivities are lower than those of buffed coatings of pure nickel.

We are aware of the fact that others have produced deposits of cobalt and nickel containing several percent of phosphorus by chemical reduction of solutions of their metal salts with hypophosphites at elevated temperatures. The properties of the deposits so obtained were of sufficient interest to lead to an attempt to find more satisfactory conditions of deposition than the non-electrolytic process which is uneconomical, produces deposits at a slow rate, and does not permit control of the composition of the deposits.

It is therefore a general object of our invention to electrodeposit phosphorus alloys of cobalt and nickel.

It is a more specific object of our invention to electrodeposit alloys containing nickel or cobalt and phosphorus from solutions containing phosphites.

Fig. 9 is a table showing typical baths for phosphorus alloys in accordance with our invention.

Figure 1:
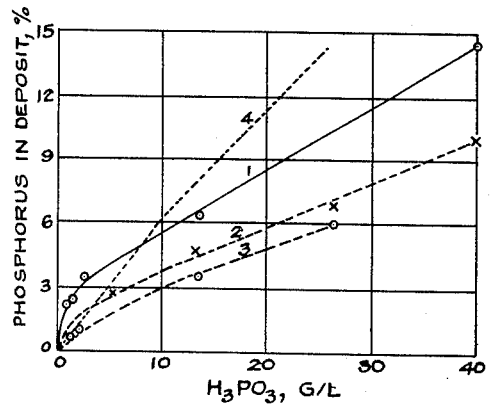
Fig. 1 is a curve showing the relation between the phosphorus in deposit and the $H_3PO_3$ content of the bath.

It was found that the conditions for the electrodeposition of the phosphorus alloys are quite different from those required for the non-electrolytic process. We have found the following contrasts therebetween: (1) non-electrolytic plating is readily conducted with ammoniacal solutions, but phosphorus alloys of cobalt and nickel cannot be electrodeposited from such solutions; (2) cobalt-phosphorus alloys cannot be obtained from an acid solution by the non-electrolytic process but are readily obtained by electrodeposition; (3) phosphites are the most satisfactory source of phosphorus for the electrodeposition process, but they produce no reduction to metal in the non-electrolytic plating process. Hypophosphites will also give deposits containing phosphorus, but these alloys are inferior.

The best deposits were obtained from ordinary nickel or cobalt baths to which phosphoric and phosphorus acids had been added. The favorable pH of the baths was between 0.5 and 2.0 depending upon their compositions. The table in Fig. 9 gives the composition of several satisfactory baths. Deposits may also be obtained from acid solutions containing only the metal phosphite (baths 3 and 7, Fig. 9).

The plating solutions were prepared by first making up an ordinary plating solution, about 1 molar in metal. A Watts bath may be used as the basis for the nickel-phosphorus bath and a cobalt choride solution for the cobalt-phosphorus bath. The phosphoric and phosphorus acids were introduced into the bath in the form of a stock solution prepared by partially neutralizing the acids to a pH of about 1.0 with a basic carbonate of the desired metal. This stock solution contained the metals as the acid salts along with free acid. When a low concentration of phosphites was required, as in bath No. 7 in Fig. 9, the acid could be added directly to the bath. With the cobalt bath, No. 7, pitting is liable to occur and the addition of a wetting agent may be necessary for the production of thick deposits. In electroforming deposits about 8 mm. thick from the latter bath it was also found expedient to add saccharin 2 g./liter to reduce the stress in the deposit.

One of the most important considerations in the successful electrodeposition of the phosphorus alloys is the pH of the plating solutions. If the pH is more than several tenths above an optimum value, the deposits are likely to be discolored, stressed, or unsound; if on the other hand the pH is too low, the cathode current efficiency is very low.

Because of the necessity of controlling the pH within narrow limits, it was apparent that buffers would simplify the control of the bath. A number of acids were tried as buffers, among them organic acids such as acetic, formic, hydroxyacetic, malic, citric, gluconic, and tartaric; and inorganic acids such as boric and phosphoric acids. Thees acids had specific effects on the quality of the deposits. For example, formic, acetic, and hydroxyacetic acids yielded good deposits from a cobalt-phosphorus plating bath, whereas citric, malic, and gluconic acids yielded highly stressed deposits. From a nickel bath, containing 60 g./liter of hydroxyacetic or citric acid, the deposits were fairly satisfactory when the pH of the bath was kept below 1. However, these deposits were found to warp and blister when they were heat-treated at 600° C. This did not occur if phosphoric acid was used as the buffering agent in the bath and, in general, this acid yielded better results than the organic buffers. In the presence of some of the organic acids in the nickel bath—tartaric, glycine, and aspartic acids—very poor deposits were obtained.

Alloy coatings from 0.05 to 0.5 mm. thick (0.002 to 0.02 in.) were deposited upon copper tubes about 5 mm. in diameter. The test for the soundness of the deposit was to dissolve the copper tube with a polysulfide solution and note whether the alloy tube held together. If it did the tube was further qualitatively tested for strength by crushing it with a pair of pliers. Observations were also made of the ductility of the deposit by noting whether the tube of alloy or fragments of it would take a permanent set upon bending. Specimens of the sound deposits were heated at various temperatures, and similar tests for strength and ductility were made again. On the basis of these qualitative tests, a decision was made as to whether the solution under investigation should be studied further or discarded.

Besides the qualitative examination of the physical properties of the deposits, their hardnesses were measured with a microhardness tester and their electrical resistivities were determined. These measurements were made on deposits as removed from the bath and on those which had been subjected to various heat treatments. The procedure was as follows. A 10- to 15-cm. length of copper tubing was plated with the alloy, then cut into several small sections and the copper stripped out. The hardness of the alloy as deposited was measured. Other sections from the same tube were heated to 400°, 600°, and 800° C., then tested after cooling. The resistivity was measured on the alloy as deposited. The measurements were repeated on the same sample after heating to 400°, 600° and 800° C. A few measurements of reflectivity and of tensile strength were also made. The phosphorus content of the alloys was determined gravimetrically by the phosphomolybdate method. The heat treatments of the alloys did not reduce their content of phosphorus. The corrosion resistance of the deposits to acids and to the salt spray was also determined.

Fig. 1 shows how the phosphorus content of the cobalt and nickel deposits varied with the concentration of phosphorous acid. Curve 1 shows deposits from a phosphorus-nickel bath with increasing amounts of phosphorous acid. Curve 2 shows deposits from a phosphorus-cobalt bath with increasing amounts of phosphorous acid. Curve 3 shows deposits from a cobalt (No. 7) bath with increasing amounts of phosphorous acid. Curve 4 represents alloys having the same value of P/(metal+P) as the bath. For a given concentration of the acid, more phosphorus was codeposited with the nickel than with the cobalt, particularly in the baths that contained low concentrations of phosphite. The dotted line, 4 in the graph represents alloys having the same ratio of phosphorus to nickel or cobalt as exists in the solution. The nickel-phosphorus alloy (curve 1) from the baths containing less phosphorous acid than 10 g./liter had a higher ratio of phosphorus to metal than existed in the bath. Accordingly, phosphorus seems to be the more readily deposited element under these conditions.

The maximum amount of phosphorus obtained in the nickel deposit was about 15 percent and in the cobalt deposit about 10 percent. No attempts were made to determine the maximum amount of phosphorus that could be introduced into the deposits. It is likely that higher ratios of phosphite to metal in the baths would give deposits higher in phosphorus.

Figure 2:
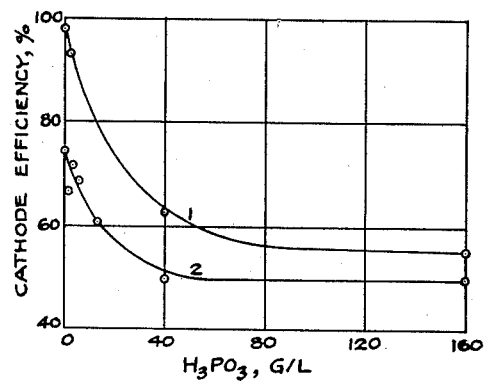
Fig. 2 is a curve showing the relation between the cathode efficiency and the $H_3PO_3$ content of the bath.

The cathode current efficiency of deposition from the nickel bath decreased markedly as the content of phosphite in the bath was increased. This is shown by the curves in Fig. 2 where 1 indicates the cobalt phosphorus bath and 2 represents the nickel-phosphorus bath.

The importance of pH and the general considerations that led to the operation of the cobalt and nickel baths at low pH have already been mentioned. If the pH of a cobalt bath were too high and no buffers were present, basic material was deposited upon the cathode. Experiments on the addition of alkali to phosphorus alloy baths indicated that precipitation did not occur until the pH reached 4 to 5 in the low phosphorus bath and 3 to 3.5 in the high phosphorus bath. Thus, the alloy baths are operated at 2.5 pH units below the precipitation point of the bath. Apparently, a low pH is necessary for the successful electroreduction of the phosphite, quite apart from the function of pH in preventing precipitation of basic compounds at the cathode.

The pH of the bath within the operable range does not have any appreciable effect upon the content of phosphorus in the deposits. The main effects of pH are on the cathode efficiency and on the soundness of the deposits. The pH of the high phosphite baths, Ni-H and Co-H (baths 2 and 5) is more critical than that of the low phosphite baths and must be kept between 0.5 to 1.0. If the pH is lower, the cathode efficiency markedly decreases. If the pH is much above 1, it is difficult to obtain uniformly bright deposits.

Temperature is one of the most important variables in plating the phosphorus alloys. The deposits obtained at room temperature were stressed and unsound. The low mechanical strength of the deposits obtained at room temperature was apparent only after the basis metal was dissolved; otherwise the deposits appeared quite satisfactory. Most of the plating was done at 75° C.

Figure 3:
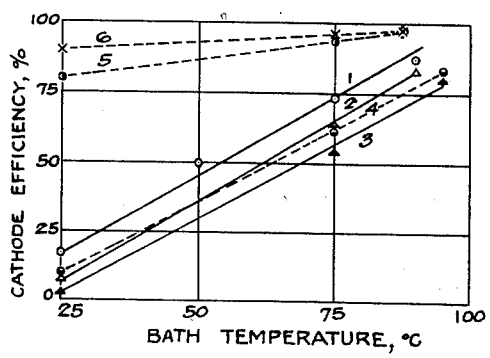
Fig. 3 is a curve showing the relation between the cathode efficiency and the bath temperature.

The operation of the cobalt bath was not as sensitive to temperature as that of the nickel bath. If the alloy baths were operated at room temperature instead of 75° C., the cathode current efficiency of the low phosphorus-cobalt baths dropped slightly, but the cathode efficiency of the corresponding nickel bath became very low. The high phosphorus-cobalt (Co-H) baths had much lower efficiencies at room temperature than at 75° C. However, they produced deposits at lower temperature and at lower pH than the corresponding nickel bath. If the nickel bath contained much phosphite at room temperature the efficiency was only a few percent and in some cases all that was obtained upon the cathode was a black coloration. The curves of Fig. 3 show how the cathode current efficiency of alloy deposition changes with the concentration of phosphite and the temperature. Curve 1 represents bath No. 1 but containing no phosphorus acid; curve 2 is bath No. 1 in accordance with the table of Fig. 9; curve 3 is bath 2; curve 4 is bath 5; curve 5 is bath 4 and curve 6 is bath 7. The cathode current efficiencies were based upon the composition of the deposit and the phosphorus was assumed to have been reduced from a valence of three.

Figure 4:
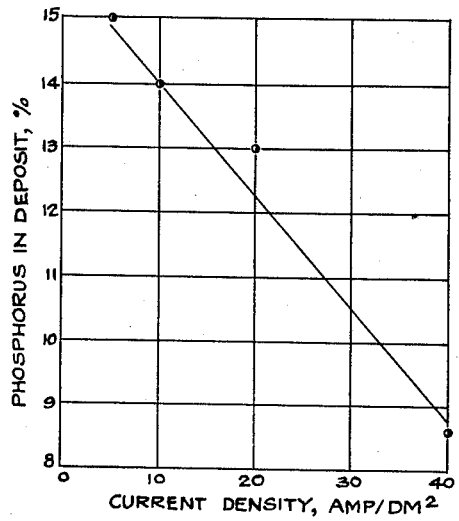
Fig. 4 is a curve showing the relation between the phosphorus in deposit and the current density.

The deposits of nickel- or cobalt-phosphorus did not vary materially in appearance or physical properties when the current density was varied over a wide range. At 75° C., deposits could be produced at current densities ranging from 5 to 30 amp./dm.$^2$, but when the current density was below 5 amp./dm.$^2$, the deposit did not always completely coat the basis metal. The content of phosphorus in the deposits plated from the low phosphorus baths did not vary appreciably with current density. The deposits from the high phosphorus-nickel bath, Ni-H (bath 2) showed a decrease in content of phosphorus as the current density was raised. This is illustrated in Fig. 4.

Figure 5:
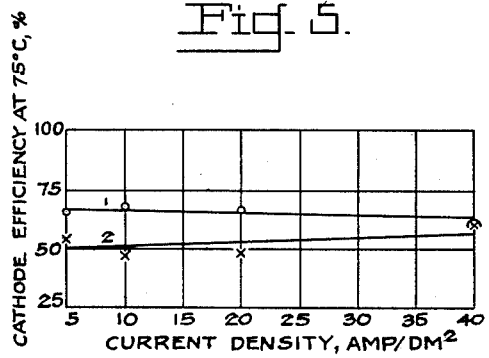
Fig. 5 is a curve showing the relation between the cathode efficiency at 75° C. and the current density.

The cathode current efficiency of deposition of neither the cobalt nor the nickel alloys varied appreciably with variations in current density as is shown in Fig. 5 wherein curve 1 is bath 1 and curve 2 is bath 2.

The deposits varied in appearance, depending on their contact of phosphorus. The deposits containing 2 percent or less of phosphorus were smooth and fine-grained but with a matte appearance very much like ordinary nickel or cobalt electrodeposits. Smooth deposits 8 mm. (0.3 in.) thick were electroformed from the Co-F bath without difficulty. Deposits with a phosphorus content of about 5 percent were semibright, and with a phosphorus content above 10 percent were fully bright. These were true bright deposits because when formed on a dull surface they increased in brightness (although not in smoothness) with increase in thickness. The bright deposits had a slightly dark or yellowish case, as might be expected from the fact that they contained a considerable amount of phosphide. Their reflectivity was about 45 to 50 percent as compared with 60 percent for nickel. The reflectivity of buffed deposits, which contained only 2 percent of phosphorus, was slightly lower than the reflectivity of the pure metals.

It was found that the phosphorus-cobalt and -nickel alloys were harder than the pure metals. The hardness of the phosphorus alloys, as deposited, ranged from about 350 to 700 Vickers. After heat treatment, the hardness of most of the deposits increased, with the maximum effect occurring at about 400° C.

Figure 6:
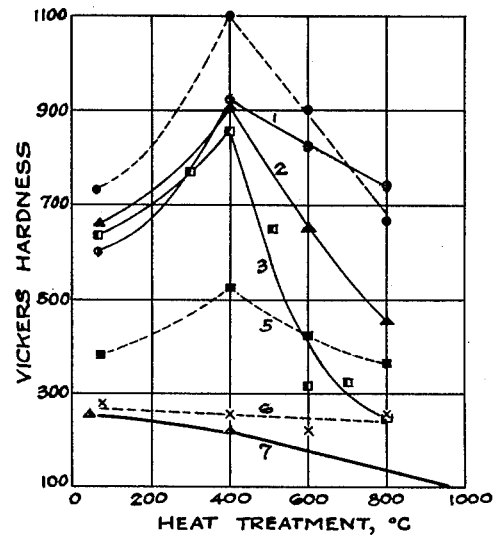
Fig. 6 is a curve showing the relation between the Vickers hardness and the heat reatment.

Fig. 6 shows typical data on the effect of 1-hour heat treatment on the hardness of nickel- (solid lines) and cobalt-phosphorus (dotted lines) deposits. In the figure, curve 1 represents bath 2 with 13 to 14% of phosphorus in deposit, curve 2 represents bath 2 with 6 to 7% of phosphorus in deposit; curve 3 represents bath 1 with 2 to 3% of phosphorus in deposit, curve 4 represents bath 5 with 10 to 11% phosphorus in deposit, curve 5 represents bath 7 with 0.5 to 1.5% of phosphorus in deposit, curve 6 represents a straight CoCl$_2$ bath, curve 7 represents a straight NiCl$_2$ bath. The low phosphorus-nickel deposits were harder than the corresponding cobalt deposits. Because the data for the nickel deposits cover a wider range of composition than for the cobalt deposits, more specific conclusions can be drawn regarding them. It is interesting to note that the hardnesses of the nickel deposits with from 2.5- to 13-percent phosphorus were about the same. The main effect of the larger contents of phosphorus was to cause the deposits to remain harder after being heat-treated at 800° C.

The curve for the low phosphorus-cobalt deposits (curve 5, Fig. 6) represents the average of about 15 deposits ranging in composition from 0.5 to 1.5-percent phosphorus. This curve represents within about 50 units the hardnesses of all of these samples. There were some minor variations in hardness depending on the bath and conditions of plating, but the data were not consistent enough to determine whether these differences were outside the limits of reproducibility. The main difference between the deposits containing 0.5 to 1.5 percent of phosphorus was that those with the higher phosphorus contents were harder than the heat treatment at 800° C. after the alloy as deposited. The high-phosphorus nickel and cobalt deposits became as hard as bright chromium after being heat-treated at 400° C. Heat treatment at higher temperatures (800° C.) does not soften the alloys as much as it does chromium. However, measurements of the hot-hardness of these alloys indicate that it was disappointingly low. The results are given in Table 1 with cobalt as a basis of comparison.

TABLE 1

*Hot hardness of phosphorus alloys of nickel and cobalt*

| Deposit | | | Vickers Hardness Number [1] at— | | | | |
|---|---|---|---|---|---|---|---|
| Metal | Bath | Phosphorus, Percent | 25° C. | 600° C. | 800° C. | 600° C. | 25° C. |
| Co | Co-L | 1.0 | 350 | 100 | 40 | 90 | 340 |
| Co | Co-H | 10 | 700 | 50 |  | 123 | 695 |
| Ni | Ni-L | 2.3 | 345 | 70 | 2 | 30 |  |
| Co | (2) |  | 320 | 95 | 49 |  | 260 |

[1] These hardnesses were taken in the order shown, that is, the second hardness at 600° C. was taken after the sample had been heated to 800° C., then cooled to 600° C.
[2] Electrolytic cobalt deposited from a chloride bath.

The ductility of the deposits was examined qualitatively by determining whether they would bend or take a permanent deformation when a specimen in the form of a tube was crushed. The cobalt deposits containing up to 1 percent of phosphorus and nickel deposits containing up to 2 percent of phosphorus were strong and slightly ductile. The low phosphorus-cobalt deposits had a tensile strength of about 9,100 kg./cm.² (130,000 lb./in.²) (as compared with about 5,300 kg./cm.²) (75,000 lb./in.² for electrodeposited cobalt) and an elongation of about 7 percent. As the phosphorus content of the deposits increased, the deposits became brittle and somewhat weaker. After being heat-treated at 400° C., which is the optimum hardening temperature, the cobalt- and nickel-phosphorus alloys became more brittle. When they were heat-treated at 800° C. the deposits with the lower phosphorus contents became more ductile than they were originally, whereas those with the higher phosphorus contents remained brittle. The high nickel-phosphorus alloys became quite weak after heating at 800° C.

Figure 7:
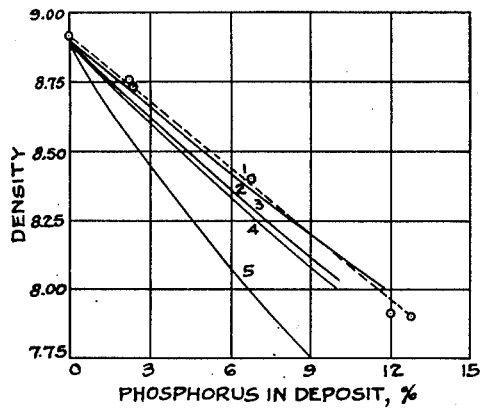
Fig. 7 is a curve showing the relation between the density and the phosphorus in deposit.

Fig. 7 shows the effect of percentage of phosphorus of the density of the nickel-phosphorus alloys. Curve 1 represents experimental values, curve 2 represents the calculation for Ni₃P plus Ni, curve 3 represents the calculation for Ni₇P₃ plus Ni, curve 4 represents the calculation for Ni₂P plus Ni, curve 5 represents the calculation for NiP₀.₈₂ plus Ni.

As shown, the density of phosphorus-nickel alloys decreases as the content of phosphorus in the deposit increases. The density of the deposits did not change appreciably as a result of heat treatment. Over the short range of composition shown, the relation between density and content of phosphorus is nearly linear, and the density-composition curve could be used to determine the composition of the deposit. The densities of several thermally prepared nickel phosphides are known: Ni₃P, 7.8; Ni₇P₃, 7.4; Ni₂P, 7.2; NiP₀.₈₂, 5.85. With these values for density, the theoretical curves for density against composition have been calculated for the nickel-phosphorus alloy and are represented in the figure by the solid lines.

Figure 8:
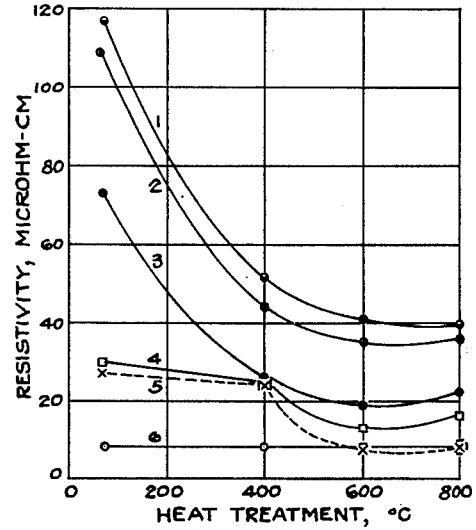
Fig. 8 is a curve showing the relation between the resistivity and the heat treatment.

The presence of phosphorus in the alloy considerably increases its electrical resistivity above that of the pure metal. On heat treating the deposits, the resistivity decreased to a minimum at 600° C. These relations are shown in Fig. 8, where curve 1 represents bath 2 with 13% of phorphorus; curve 2 represents bath 2 with 10% of phosphorus; curve 3 represents bath 2 with 7% of phosphorus; curve 4 represents bath 1 with 2.2% of phosphorus; curve 5 represents bath 7 with 1.3% of phosphorus; curve 6 represents a bath similar to bath 1 but containing no phosphorous acid.

No measurements were made of the magnetic properties of the phosphorus alloys beyond testing them with a magnet. Cobalt deposits containing up to 10 percent of phosphorus are magnetic. Nickel deposits are nonmagnetic if they contain more than 8 percent of phosphorus.

As cobalt and nickel phosphides that are prepared by thermal methods are not attacked by hydrochloric acid, it was expected that the phosphorus alloys would be less attached by this acid than are the pure metals. This expectation was not entirely borne out, as the low phosphorus-cobalt and -nickel alloys (containing 1 to 2% of phosphorus) were attacked by hydrochloric acid more rapidly than were the pure metals. However, the high phosphorus-nickel alloy (containing 10% to 15% of phosphorus) was more resistant than pure nickel, and both the high phosphorus alloys would be less attached by this acid alloys were more resistant to attack by nitric acid than the pure metals.

TABLE 2

*Rates of attack of cobalt, nickel, phosphorus cobalt, and phosphorus nickel by nitric and hydrochloric acids*

IN 1:1 HYDROCHLORIC ACID

| Metal | Weight loss in mg./cm.² hr. | | |
|---|---|---|---|
| | As plated | Heated to 400° C. | Heated to 600° C. |
| Co | 1.2 | | |
| Co+1% P | 20.0 | 9.3 | 3.1 |
| Co+10% P | 4.6 | | 0.2 |
| Ni | 0.2 | | |
| Ni+2% P | 1.9 | 1.5 | 1.1 |
| Ni+14% P | 0.004 | | 0.003 |

IN AIR ABOVE CONCENTRATED HYDROCHLORIC ACID

| Co | 0.03 | | |
|---|---|---|---|
| Co+1% P | (¹) | | |
| Co+10% P | (¹) | 0.5 | 0.1 |
| Ni | 0.02 | | |
| Ni+2% P | 1.6 | | 1.3 |
| Ni+14% P | 0.004 | | 0.01 |

IN 1:1 NITRIC ACID

| Co | 1,860.0 | | |
|---|---|---|---|
| Co+1% P | | | |
| Co+10% P | 960 | | 600.0 |
| Ni | 168.0 | | |
| Ni+2% P | 234.0 | | 90.0 |
| Ni+14% P | 36.0 | | |

¹ These react very rapidly and fell apart during the 16-hr. test run.

In the salt spray test, the low phosphorus-cobalt alloy plated upon steel did not afford the steel as much protection as did pure cobalt coatings, and the nature of the corrosion was different. Rust spots formed on the cobalt-alloy coatings in the same manner that they form on standard nickel corrosion test samples and the deposits did not tarnish appreciably. Pure cobalt coatings, even if only 0.005 mm. (0.0002 in.) thick, tarnished rapidly in the salt spray, forming a brown or dark purple film and no rust, or rust spots were formed. Bright nickel-phosphorus coatings (10 to 15% phosphorus) behaved in the salt spray very much like ordinary nickel coatings. After 2 days, thin deposits (several thousandths of a millimeter thick) had numerous rust spots, but a deposit about 0.035 mm. (0.0014 in.) thick did not show any rust spots after two weeks.

The phosphorus alloys, particularly the high phosphorus-cobalt alloy, turned black when treated for less than a minute with an oxidizing acid such as nitric acid, or when it was made anodic in the bath. When the black coating was not made too thick, it was hard and durable, and it may have some decorative value as well as affording protection against corrosion.

The phosphorus-cobalt and -nickel deposits should be useful wherever hardness is required and might be considered as an alternative to chromium deposits. They would be particularly useful if the deposits are subjected to heat, as ordinary hard nickel will be permanently softened after heating to 600° C., whereas the phosphorus alloys do not change appreciably in hardness.

The bright nickel-phosphorus coating could be used for protective or decorative plating, although it is not as white or as bright as commercial bright nickel. The phosphorus-nickel alloy can be chromium plated, but the finish is satin rather than bright. The bright nickel-phosphorus bath can be more easily controlled than other bright nickel baths because it contains no organic constituents, and the brightening agent, phosphite, is used in large quantity. The phosphorus-cobalt deposit may also be used for decorative finishes as it can be plated bright.

Although the invention has been described with considerable detail it is not our intention to limit the invention to the precise embodiment shown since numerous variations can be employed without departing from the spirit of the invention.

We claim:

1. The method of electrodepositing alloys of phosphorus with a metal of the group consisting of nickel and cobalt which comprises electrolyzing a solution containing said metal in the form of a salt chosen from the group consisting of sulphates and chlorides in the presence of phosphoric acid and phosphorous acid and having a pH of about 0.5 to 2.0.

2. The method of electrodepositing alloys of phosphorus with a metal of the group consisting of nickel and cobalt which comprises electrolyzing a solution containing said metal in the form of a salt chosen from the group consisting of sulphates and chlorides in the presence of phosphoric acid and phosphorous acid at a current density of about 5 to 40 A./dm.$^2$, said solution having a pH of from 0.5 to 2.0.

3. The method of electrodepositing an alloy of phosphorus with cobalt which comprises electrolyzing a solution containing cobalt in the form of a chloride in the presence of phosphorous acid and phoshoric acid at a current density of about 5 to 40 A./dm.$^2$ and a temperature of about 75 to 95° C., said solution having a pH of from 0.5 to 2.0.

4. The invention according to claim 3 in which the said phosphoric acid is present in an amount of about 50 grams per liter.

5. The invention according to claim 4 in which the said phosphorous acid is present in an amount of from about 2 to 160 grams per liter.

6. An electrolyte for depositing alloys of phosphorus with a metal from the group consisting of nickel and cobalt which comprises a solution containing a salt from the group consisting of the sulphates and chlorides of the metals of the said group, phosphoric acid and phosphorous acid and having a pH of about 0.5 to 2.0.

7. The method of electrodepositing an alloy of phosphorus with nickel which comprises electrolyzing a solution containing nickel in the form of a chloride in the presence of phosphorous acid and phosphoric acid at a current density of about 5 to 40 A./dm.$^2$ and a temperature of about 75 to 95° C., said solution having a pH of from 0.5 to 1.0.

ABNER BRENNER.
DWIGHT E. COUCH.
EUGENIA K. WILLIAMS.

References Cited in the file of this patent

UNITED STATES PATENTS

| Number | Name | Date |
|---|---|---|
| 2,069,566 | Tuttle | Feb. 2, 1937 |

FOREIGN PATENTS

| Number | Country | Date |
|---|---|---|
| 1,657 of 1897 | Great Britain | Mar. 13, 1897 |
| 10,133 of 1915 | Great Britain | Nov. 18, 1915 |

OTHER REFERENCES

Brenner et al., Proceedings of the American Electroplaters' Society, 33rd Convention, June 1946, pp. 23–26.

Brenner et al., Proceedings of the American Electroplaters' Society, 34th Convention, June 1947, pp. 156–160, 167–168.

Watts, Transactions American Electrochemical Society, vol. 23 (1913), pp. 138, 139, 141, 142.

Kalmus, Electroplating With Cobalt—Part III, Department of Mines (Canda), 1915, pp. 45–46.